(12) United States Patent
Yachida et al.

(10) Patent No.: US 12,437,416 B2
(45) Date of Patent: Oct. 7, 2025

(54) DETERMINATION APPARATUS

(71) Applicant: NEC Corporation, Tokyo (JP)

(72) Inventors: Shoji Yachida, Tokyo (JP); Keiko Inoue, Tokyo (JP); Azusa Sawada, Tokyo (JP); Toshinori Hosoi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 483 days.

(21) Appl. No.: 17/919,584

(22) PCT Filed: Apr. 24, 2020

(86) PCT No.: PCT/JP2020/017750
§ 371 (c)(1),
(2) Date: Oct. 18, 2022

(87) PCT Pub. No.: WO2021/214995
PCT Pub. Date: Oct. 28, 2021

(65) Prior Publication Data
US 2023/0154012 A1    May 18, 2023

(51) Int. Cl.
*G01N 21/90* (2006.01)
*G06T 7/00* (2017.01)
*G06T 7/20* (2017.01)

(52) U.S. Cl.
CPC ........... *G06T 7/20* (2013.01); *G01N 21/90* (2013.01); *G06T 7/0002* (2013.01); *G06T 2207/10152* (2013.01); *G06T 2207/20021* (2013.01)

(58) Field of Classification Search
CPC ....... G01N 15/1433; G01N 2015/1006; G01N 15/1459; G01N 15/14; G01N 2015/1493; G01N 15/1429; G01N 15/147; G01N 2015/1497; G01N 15/0227; G01N 15/1434; G01N 21/8851; G01N 15/01;
(Continued)

(56) References Cited

U.S. PATENT DOCUMENTS

| 2002/0171054 | A1 | 11/2002 | Yamazaki et al. |
| 2009/0309961 | A1* | 12/2009 | Miyashita ............ G06F 18/214 348/222.1 |

(Continued)

FOREIGN PATENT DOCUMENTS

| DE | 60223956 T3 * | 5/2011 | ......... G01N 21/9027 |
| JP | S50-011094 A | 2/1975 | |

(Continued)

OTHER PUBLICATIONS

International Search Report for PCT Application No. PCT/JP2020/017750, mailed on Jul. 28, 2020.
(Continued)

*Primary Examiner* — Michael P Stafira
(74) *Attorney, Agent, or Firm* — Sughrue Mion, PLLC

(57) ABSTRACT

A determination apparatus includes: a dividing unit configured to divide chronological image data acquired by imaging a liquid filled in a container while switching between a plurality of illumination conditions, into chronological image data corresponding to the illumination conditions; and a determining unit configured to determine foreign matter contained in the container based on each of the chronological image data obtained by division by the dividing unit.

7 Claims, 15 Drawing Sheets

DETERMINATION SYSTEM 100

(58) Field of Classification Search
CPC ......... G01N 15/149; G01N 2015/1486; G01N 2015/144; G01N 33/574; G01N 15/00; G01N 15/1456; G01N 1/30; G01N 15/1404; G01N 21/9501; G01N 33/5091; G01N 2015/1452; G01N 15/1436; G01N 21/6428; G01N 23/2251; G01N 15/1468; G01N 15/10; G01N 2021/6439; G01N 21/956; G01N 23/225; G01N 33/54346; G01N 33/582; G01N 15/1425; G01N 2015/016; G01N 2021/8887; G01N 33/54313; G01N 33/493; G01N 33/587; G01N 21/9027; G01N 1/286; G01N 1/36; G01N 2001/2873; G01N 2015/1477; G01N 33/4833; G01N 33/50; G01N 33/552; G01N 1/34; G01N 2001/2866; G01N 2001/302; G01N 2001/368; G01N 21/6486; G01N 2800/52; G01N 33/57484; G01N 1/28; G01N 2015/1027; G01N 2015/1402; G01N 2015/1445; G01N 33/60; G01N 15/06; G01N 15/1427; G01N 15/1484; G01N 2015/1028; G01N 2015/1472; G01N 2021/1765; G01N 2015/0038; G01N 2015/1488; G01N 15/0205; G01N 21/17; G01N 21/51; G01N 21/64; G01N 2015/1029; G01N 33/15; G01N 21/31; G01N 21/84; G01N 15/0255; G01N 15/075; G01N 2015/0294; G01N 21/6456; G01N 33/585; G01N 2015/0053; G01N 21/8806; G01N 15/0211; G01N 2015/0288; G01N 21/47; G01N 21/6458; G01N 21/94; G01N 33/4915; G01N 15/1409; G01N 2015/1413; G01N 21/53; G01N 21/85; G01N 33/52; G01N 2015/1406; G01N 2021/6421; G01N 2021/8883; G01N 33/5094; G01N 2015/025; G01N 2015/1415; G01N 2021/8861; G01N 23/20; G01N 33/56983; G01N 33/86; G01N 2015/012; G01N 2021/8854; G01N 2021/8867; G01N 21/78; G01N 21/8803; G01N 33/483; G01N 2015/1019; G01N 2015/1411; G01N 2021/058; G01N 21/05; G01N 21/95607; G01N 23/046; G01N 23/223; G01N 1/14; G01N 15/1012; G01N 2015/018; G01N 2015/1454; G01N 2201/068; G01N 2223/611; G01N 33/02; G01N 33/48792; G01N 33/556; G01N 33/6854; G01N 2015/1495; G01N 2021/6441; G01N 2021/6497; G01N 2201/12; G01N 33/56972; G01N 15/0272; G01N 2015/0019; G01N 2015/0096; G01N 2223/401; G01N 2223/419; G01N 23/04; G01N 33/48; G01N 15/1023; G01N 2015/0046; G01N 21/65; G01N 2223/616; G01N 23/2206; G01N 33/49; G01N 33/58; G01N 35/00; G01N 2015/0222; G01N 2015/1438; G01N 2021/8848; G01N 21/49; G01N 21/91; G01N 23/06; G01N 27/84; G01N 15/1031; G01N 21/01; G01N 21/6452; G01N 21/88; G01N 21/958; G01N 2223/304; G01N 2223/33; G01N 2223/652; G01N 23/20008; G01N 33/0091; G01N 15/02; G01N 2015/0277; G01N 2015/0687; G01N 2015/1024; G01N 2021/6419; G01N 2021/8918; G01N 21/532; G01N 21/90; G01N 2223/1016; G01N 2223/402; G01N 33/80; G01N 15/0612; G01N 15/0656; G01N 15/08; G01N 2015/0011; G01N 2015/03; G01N 2015/1447; G01N 2021/177; G01N 2021/845; G01N 21/3563; G01N 21/4738; G01N 21/554; G01N 21/63; G01N 2201/1296; G01N 2223/6116; G01N 23/203; G01N 2333/7051; G01N 2458/10; G01N 2570/00; G01N 33/5005; G01N 33/5047; G01N 33/5304; G01N 15/088; G01N 2015/0846; G01N 2021/4764; G01N 2021/8592; G01N 2035/0091; G01N 21/1717; G01N 21/25; G01N 21/39; G01N 21/59; G01N 21/645; G01N 21/95; G01N 2201/06113; G01N 2201/0826; G01N 23/025; G01N 23/222; G01N 29/022; G01N 33/1826; G01N 33/4905; G01N 33/5079; G01N 33/6803; G01N 35/00871; G01N 35/08; G01N 37/00; G01N 1/2208; G01N 1/2273; G01N 13/00; G01N 15/042; G01N 15/0606; G01N 2001/2223; G01N 2001/245; G01N 2015/019; G01N 2015/045; G01N 2021/1787; G01N 2021/575; G01N 2021/8816; G01N 2021/8845; G01N 2021/95638; G01N 2035/00881; G01N 21/00; G01N 21/27; G01N 21/3577; G01N 21/57; G01N 21/82; G01N 2223/102; G01N 2223/641; G01N 2223/646; G01N 2223/66; G01N 23/02; G01N 23/2252; G01N 2333/11; G01N 31/02; G01N 33/1886; G01N 33/543; G01N 33/54326; G01N 33/569; G01N 33/68; G01N 1/4022; G01N 15/1492; G01N 2001/4027; G01N 2013/0216; G01N 2015/0003; G01N 2015/0026; G01N 2015/014; G01N 2015/0233; G01N 2015/1016; G01N 2015/142; G01N 2015/145; G01N 2015/1481; G01N 2021/1791; G01N 2021/6417; G01N 2021/653; G01N 2021/825; G01N 2021/8557; G01N 2021/8829; G01N 2021/887; G01N 2021/8893; G01N 2021/8896; G01N 2021/9511; G01N 2021/95615; G01N 21/0303; G01N 21/1702; G01N 21/21; G01N 21/35; G01N 21/359; G01N 21/55; G01N 21/648; G01N 21/8483; G01N 21/9503; G01N 21/9515; G01N 21/95684; G01N 2201/0612; G01N 2201/062; G01N 2201/0635; G01N 2201/106; G01N 2203/0019; G01N 2203/0067; G01N 2203/0647; G01N 2203/0676; G01N 2203/0682; G01N 2223/03; G01N 2223/418; G01N 2291/02416; G01N 23/2208; G01N 2333/75; G01N 25/72; G01N 2800/00; G01N 29/02; G01N 29/2418; G01N 3/068; G01N 3/08; G01N 31/12; G01N 33/24; G01N 33/28; G01N 33/42; G01N 33/487; G01N 33/526; G01N 33/533; G01N 33/558; G01N 1/08; G01N 1/2813; G01N 1/44; G01N 15/04; G01N 15/0625; G01N 2013/003; G01N 2015/003; G01N 2015/0061; G01N 2015/011; G01N 2015/1014; G01N 2015/103; G01N 2015/1422; G01N 2021/0346; G01N 2021/3595; G01N 2021/5903; G01N 2021/5961; G01N 2021/635; G01N 2021/8578; G01N 2021/8822; G01N 2021/8825; G01N 2021/8835; G01N 2021/8858; G01N 2021/8877; G01N 2021/888; G01N 2021/95676; G01N 2035/00099; G01N 2035/00306; G01N 2035/00326; G01N 2035/00346; G01N 2035/00465; G01N 2035/1046; G01N 21/07; G01N 21/251; G01N 21/272; G01N 21/453; G01N 21/4788; G01N 21/6402; G01N 21/66; G01N 21/71; G01N 21/73; G01N 21/8903; G01N 21/9036; G01N 21/9081; G01N 21/952; G01N 21/95692; G01N 2201/0218; G01N 2201/0461; G01N 2201/10; G01N 2201/1042; G01N 2223/053; G01N 2223/076; G01N 2223/307; G01N 2223/3306; G01N 2223/62; G01N 2223/629; G01N 2291/044; G01N 2291/267; G01N 2291/2697; G01N 23/00; G01N 23/044; G01N 23/18; G01N 23/20091; G01N 23/201; G01N 23/2055; G01N 23/207; G01N 23/2204; G01N 27/44713; G01N 27/44721; G01N 27/44791; G01N 27/628; G01N 27/82; G01N 29/04; G01N 29/043; G01N 29/14; G01N 29/4481; G01N 3/565; G01N 33/004; G01N 33/146; G01N 33/44; G01N 33/445; G01N 33/5008; G01N 33/53; G01N 33/54387; G01N 33/554; G01N 33/564; G01N 33/721; G01N 35/00613; G01N 35/0098; G01N 35/1004

See application file for complete search history.

(56) References Cited

U.S. PATENT DOCUMENTS

2017/0082430 A1\* 3/2017 Tasaki .................... G06V 20/58
2019/0297242 A1\* 9/2019 Terauchi .............. H04N 23/951

FOREIGN PATENT DOCUMENTS

| JP | H07-092109 A | | 4/1995 |
|---|---|---|---|
| JP | H0792108 A | \* | 4/1995 |
| JP | H0792109 A | \* | 4/1995 |
| JP | 2003-107010 A | | 4/2003 |
| JP | 2008268236 A | \* | 11/2008 |
| JP | 2010-048712 A | | 3/2010 |
| JP | 2010-181231 A | | 8/2010 |
| JP | 2011-085575 A | | 4/2011 |
| JP | 2013186075 A | \* | 9/2013 |

OTHER PUBLICATIONS

Hitachi Industry & Control Solutions Ltd., "Technologies High-definition inspection", Hitachi High Resolution Inspection System High-definition automatic inspection machine HR series, Jun. 2015.
Extended European Search Report for EP Application No. 20932428.4, dated on May 24, 2023.
Ge Ji et al: "A System for Automated Detection of Ampoule Injection Impurities", IEEE Transactions on Automation Science and Engineering, IEEE Service Center, New York, NY, US, vol. 14, No. 2, Apr. 1, 2017, pp. 1119-1128, XP011644941, ISSN: 1545-5955, DOI: 10. 1109/TASE.2015.2490061 [retrieved on Apr. 5, 2017].

\* cited by examiner

DETERMINATION SYSTEM 100

Fig.9

| IMAGING TIME | IMAGE DATA |
|---|---|
| | IMAGE DATA(FIRST STATE) |
| | IMAGE DATA(SECOND STATE) |
| | IMAGE DATA(FIRST STATE) |
| | IMAGE DATA(SECOND STATE) |
| | ⋮ |

DETERMINATION APPARATUS

This application is a National Stage Entry of PCT/JP2020/017750 filed on Apr. 24, 2020, the contents of all of which are incorporated herein by reference, in their entirety.

TECHNICAL FIELD

The present invention relates to a determination apparatus, a determination method, a recording medium, and a determination system.

BACKGROUND ART

A technique for detecting foreign matter in a liquid in a container is known.

One of the techniques used in detecting foreign matter is described in Patent Document 1, for example. Patent Document 1 describes a foreign matter detection apparatus that has a first irradiation source irradiating a container with first irradiation light, a second irradiation source irradiating the container with second irradiation light, an imaging means, and an inspecting means. According to Patent Document 1, the imaging means captures an image of transmitted light on the transmitted light path of the first irradiation light from the container, and captures an image of diffuse reflected light of the second irradiation light. Then, the inspecting means detects foreign matter in a filled liquid based on the images acquired by the imaging means. Moreover, Patent Document 1 discloses irradiation with the first irradiation light and the second irradiation light in different time periods.

Patent Document 1: Japanese Unexamined Patent Application Publication JP-A 2003-107010

In the case of irradiating with the first irradiation light and the second irradiation light simply in different time periods as described in Patent Document 1, an inspection may take time, and it may be impossible to capture an image at an appropriate timing for the properties of foreign matter, such as the weight of foreign matter. As a result, there is a possibility that foreign matter cannot be efficiently detected with accuracy.

SUMMARY

Accordingly, an object of the present invention is to provide a determination apparatus, a determination method, a recording medium, and a determination system which solve the problem of a possibility that foreign matter cannot be efficiently detected with accuracy.

In order to achieve the object, a determination apparatus as an aspect of the present disclosure includes: a dividing unit configured to divide chronological image data acquired by imaging a liquid filled in a container while switching between a plurality of illumination conditions, into chronological image data corresponding to the illumination conditions; and a determining unit configured to determine foreign matter contained in the container based on each of the chronological image data obtained by division by the dividing unit.

Further, a determination method as another aspect of the present disclosure is a determination method executed by a determination device. The determination method includes: dividing chronological image data acquired by imaging a liquid filled in a container while switching between a plurality of illumination conditions, into chronological image data corresponding to the illumination conditions; and determining foreign matter contained in the container based on each of the chronological image data obtained by division.

Further, a recording medium as another aspect of the present disclosure is a non-transitory computer-readable recording medium having a program recorded thereon. The program includes instructions for causing a determination apparatus to implement: a dividing unit configured to divide chronological image data acquired by imaging a liquid filled in a container while switching between a plurality of illumination conditions, into chronological image data corresponding to the illumination conditions; and a determining unit configured to determine foreign matter contained in the container based on each of the chronological image data obtained by division by the dividing unit.

Further, a determination system as another aspect of the present disclosure includes: a first lighting unit configured to emit light so that light transmitted through a container enters an imaging device acquiring image data; a second lighting unit configured to emit light so that light transmitted through the container does not enter the imaging device acquiring image data; the imaging device configured to image a liquid filled in the container in an environment that an illumination condition is switched between a plurality of illumination conditions including a first state in which the first lighting unit emits light and a second state in which the second lighting unit emits light; and a determination apparatus including a dividing unit configured to divide chronological image data acquired by the imaging device into chronological image data corresponding to the illumination conditions, and a determining unit configured to determine foreign matter contained in the container based on each of the chronological image data obtained by division by the dividing unit.

With the respective configurations as described above, it is possible to provide a determination apparatus, a determination method, a recording medium, and a determination method which enables accurate and efficient detection of foreign matter.

BRIEF DESCRIPTION OF DRAWINGS

FIG. 9 is a view showing an example of image information;

EXAMPLE EMBODIMENTS

First Example Embodiment

Figure 1:
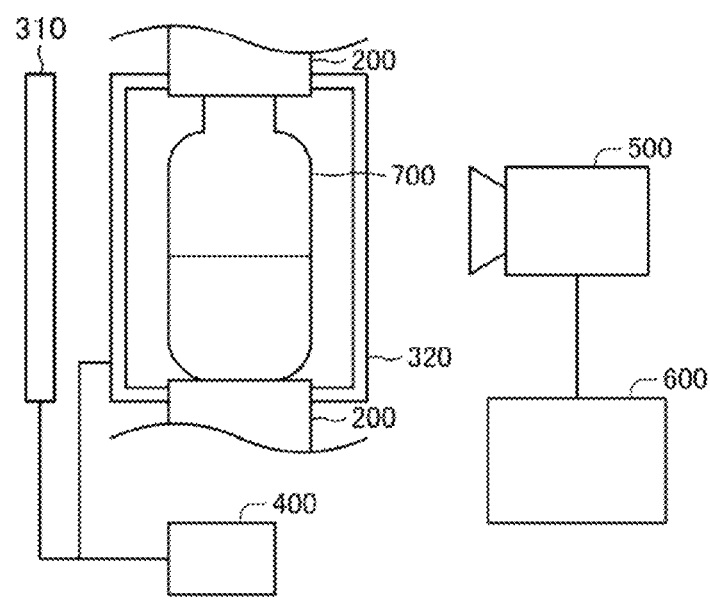
FIG. 1 is a view showing an example of a configuration of a determination system in a first example embodiment of the present disclosure.
Figure 2:
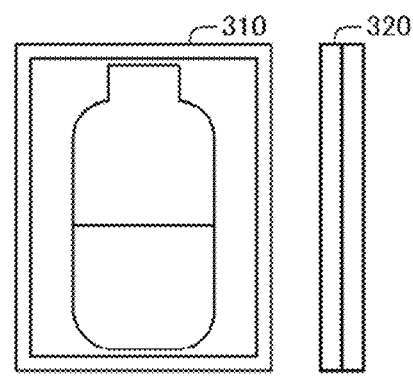
FIG. 2 is a view showing an example of a positional relation between a container and a light.
Figure 3:
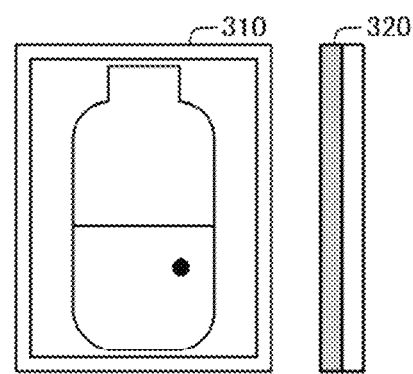
FIG. 3 is a view for describing an example of turning on the light.
Figure 4:
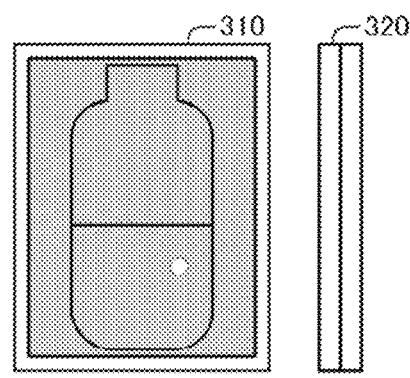
FIG. 4 is a view for describing an example of turning on the light.
Figure 5:
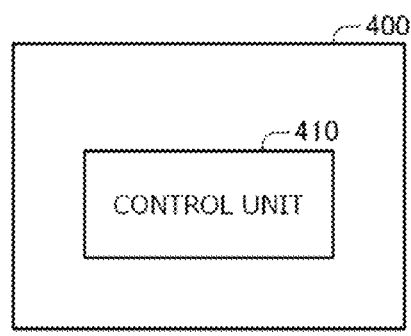
FIG. 5 is a block diagram showing an example of a configuration of an illumination control device.
Figure 6:
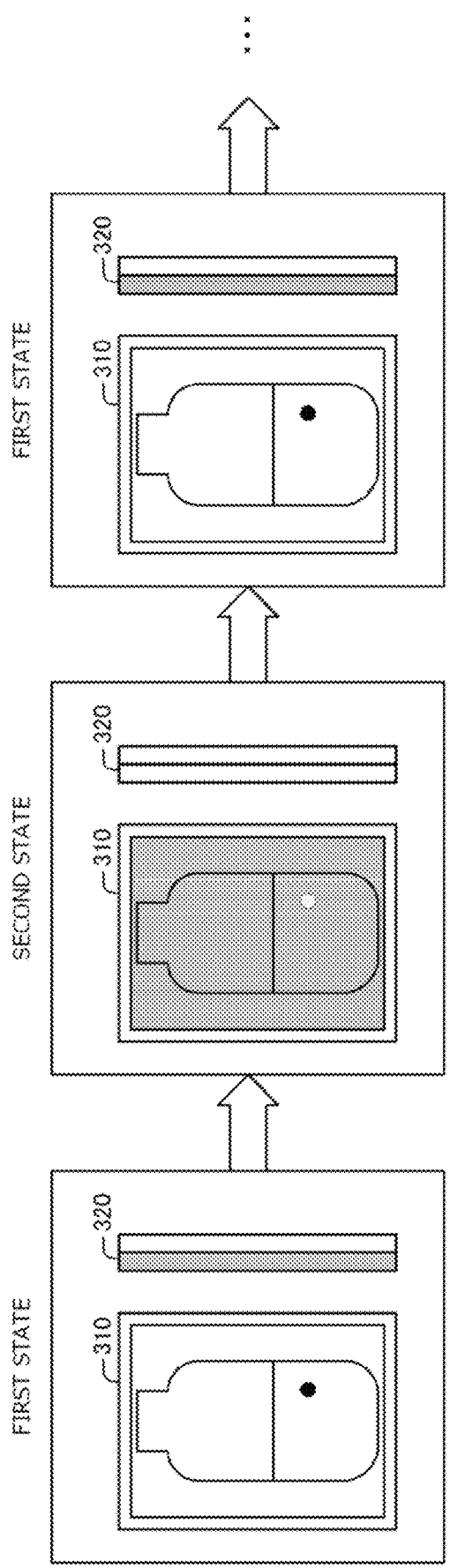
FIG. 6 is a view for showing an example of lighting control by the illumination control device.
Figure 7:
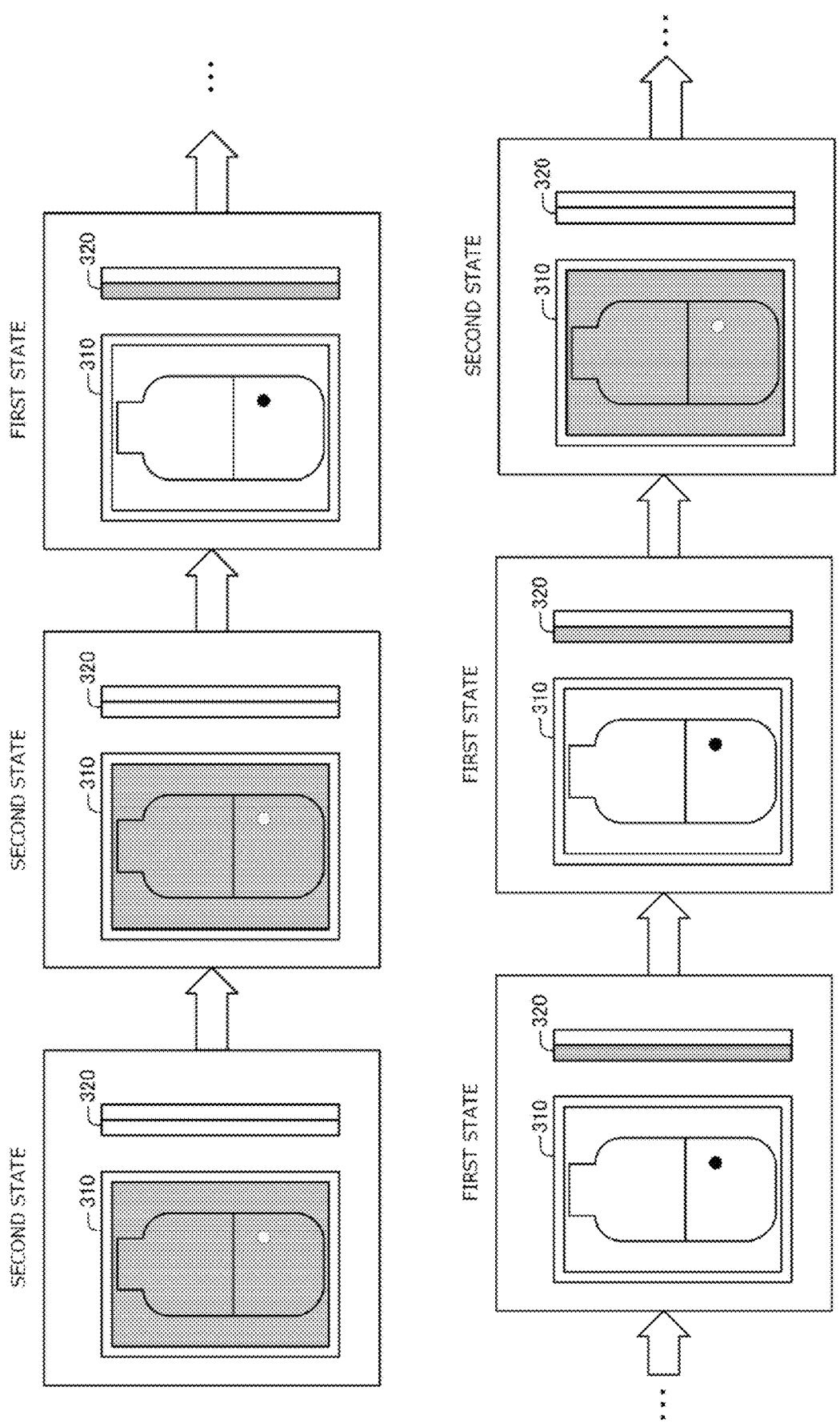
FIG. 7 is a view for showing an example of lighting control by the illumination control device.
Figure 8:
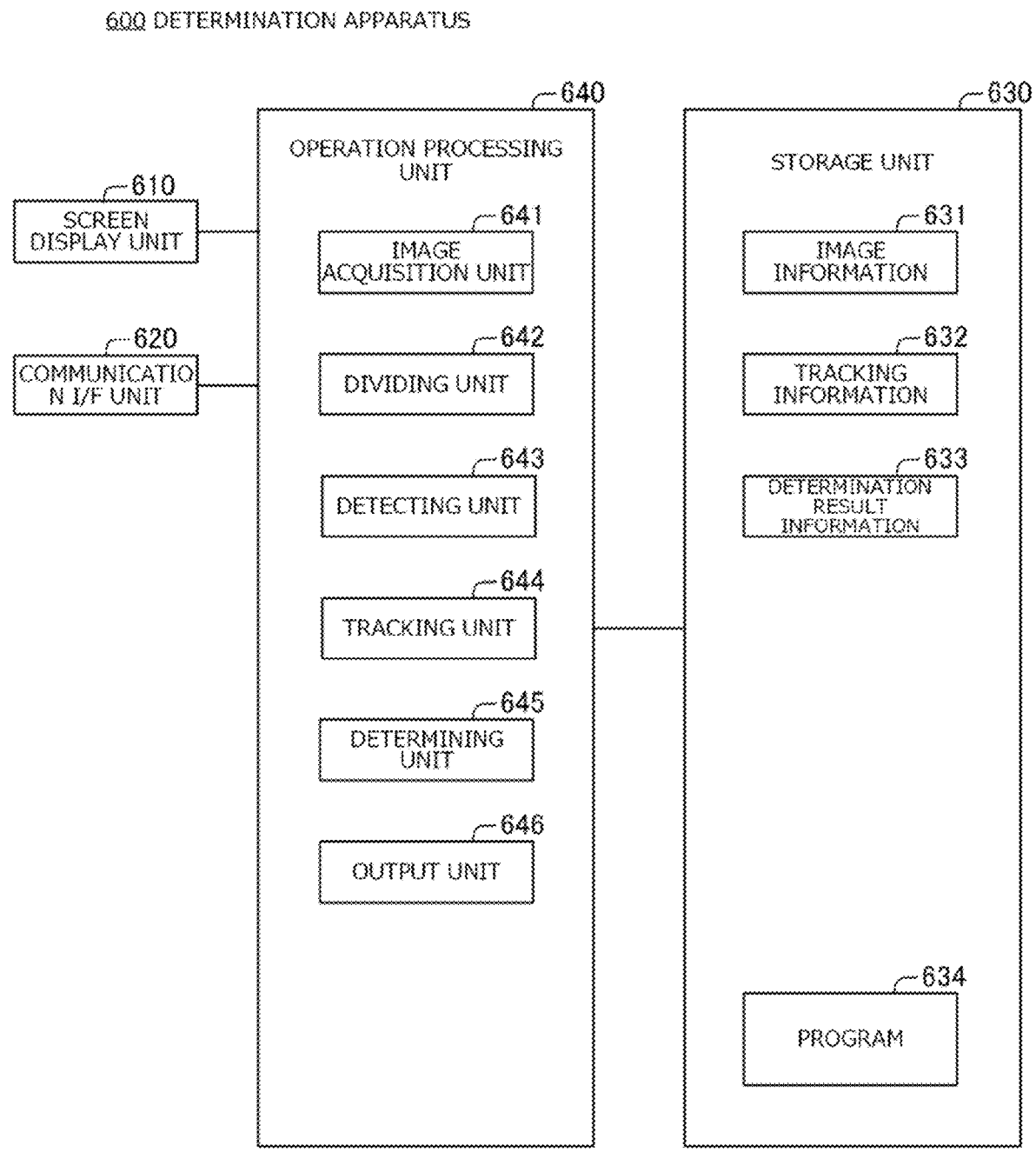
FIG. 8 is a block diagram showing an example of a configuration of a determination apparatus.
Figure 10:
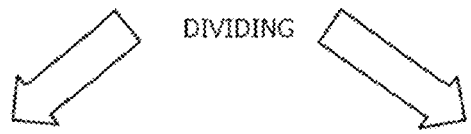
FIG. 10 is a view showing an example of processing by a dividing unit.
Figure 11:
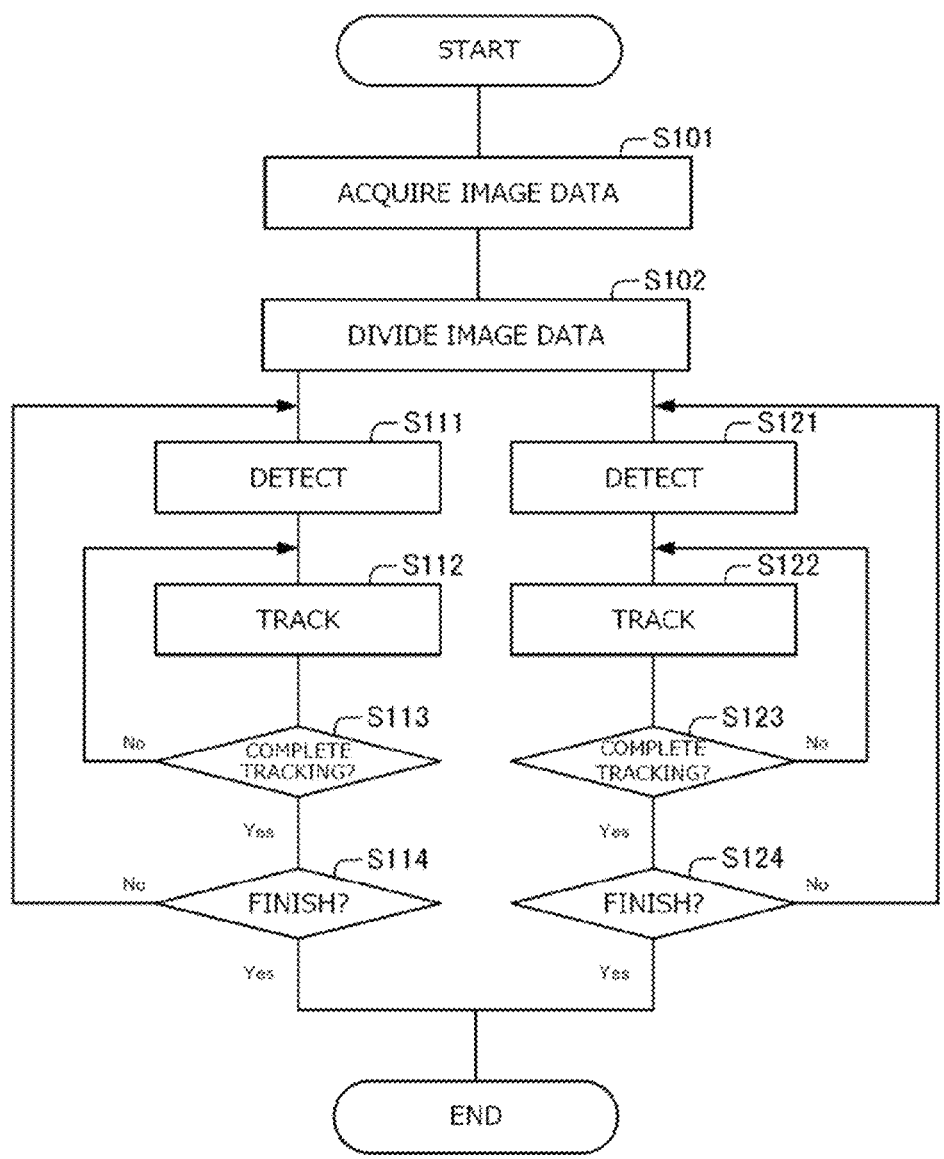
FIG. 11 is a flowchart showing an example of an operation of the determination apparatus in the first example embodiment of the present disclosure.
Figure 12:
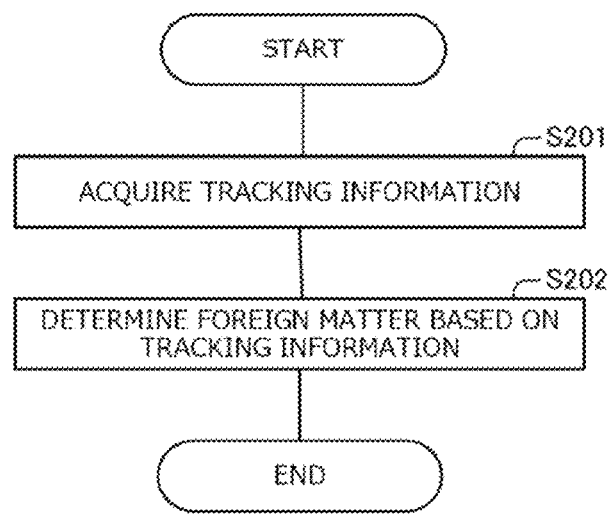
FIG. 12 is a flowchart showing an example of processing by a determining unit.
Figure 13:
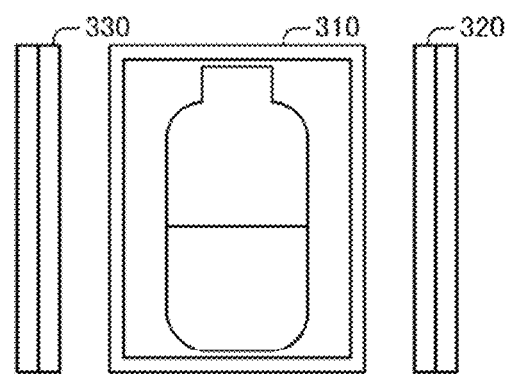
FIG. 13 is a view showing an example of another positional relation between the container and the light.

A first example embodiment of the present disclosure will be described with reference to FIGS. 1 to 13. FIG. 1 is a view showing an example of a configuration of a determination system 100. FIG. 2 is a view showing an example of a positional relation between a container 700 and a light. FIGS. 3 and 4 are views for describing examples of turning on the light. FIG. 5 is a block diagram showing an example of a configuration of an illumination control device 400. FIGS. 6 and 7 are views showing examples of lighting control by the illumination control device 400. FIG. 8 is a block diagram showing an example of a configuration of a determination apparatus 600. FIG. 9 is a view showing an example of image information 631. FIG. 10 is a view showing an example of processing by a dividing unit 642. FIG. 11 is a flowchart showing an example of an operation of the determination apparatus 600. FIG. 12 is a flowchart showing an example of processing by a determining unit 645. FIG. 13 is a view showing an example of another positional relation between the container 700 and the light.

In the first example embodiment of the present disclosure, a determination system 100 will be described that detects objects mixed in the container 700 filled with a liquid such as water or medicine and determines foreign matter among the detected objects. As will be described later, the determination system 100 acquires chronological image data by imaging with a camera 500 while switching between a plurality of illumination conditions. For example, the determination system 100 acquires chronological image data while switching between a state of irradiating the container 700 with light from a first illumination unit 310 and a state of irradiating the container 700 with light from a second illumination unit 320 at predetermined intervals. Then, the determination system 100 divides the acquired chronological image data into chronological image data corresponding to the respective states, and thereafter determines foreign matter based on each of the division chronological image data.

In this example embodiment, foreign matters to be determined include foreign matter that transmits light, such as a glass chip, and foreign matter that does not transmit light, such as a rubber chip and hair. In general, foreign matter that transmits light, such as a glass chip, has a greater specific gravity than foreign matter that does not transmit light, such as a rubber chip and hair, and more quickly sinks to the bottom from a swirling state in the liquid filled inside the container 700.

Further, in this example embodiment, in a state shown in FIG. 1, a side from which a liquid is filled in the container 700 is defined as an upper side, and the opposite side is defined as a lower side. In the case of FIG. 1, the liquid filled inside the container 700 is pooled on the lower side of the container 700.

FIG. 1 is a side view showing an example of an overall configuration of the determination system 100. Referring to FIG. 1, the determination system 100 includes, for example, a grasping device 200, the first illumination unit 310, the second illumination unit 320, the illumination control device 400, the camera 500, and the determination apparatus 600. As shown in FIG. 1, the first illumination unit 310 and the illumination control device 400 are connected so as to be able to communicate with each other. Moreover, the second illumination unit 320 and the illumination control device 400 are connected so as to be able to communicate with each other. Moreover, the camera 500 and the determination apparatus 600 are connected so as to be able to communicate with each other. Moreover, the illumination control device 400 and the camera 500 can be connected so as to be able to communicate with each other.

The grasping device 200 is a device which grasps the container 700. For example, the grasping device 200 includes an upper grasping part projecting downward and contacting the upper side of the container 700, and a lower grasping part projecting upward and contacting the lower side of the container 700. As shown in FIG. 1, the upper grasping part of the grasping device 200 contacts the container 700 from the upper side of the container 700, the lower grasping part contacts the container 700 from the lower side of the container 700, and consequently, the grasping device 200 grasps the container 700 while sandwiching the container 700 from above and below. Meanwhile, the grasping device 200 may grasp the container 700 by a method other than that illustrated above.

Further, the grasping device 200 can tilt or rotate the container 700 while sandwiching and grasping the container 700. By tilting or rotating the grasping device 700 in a state where the grasping device 200 sandwiches the container 700, foreign matter subsiding in the container 700 can be stirred up. In this example embodiment, a configuration for tilting or rotating the container 700 of the grasping device 200 is not particularly limited. The grasping device 200 may be configured to tilt or rotate the container 700 by a known method.

The first illumination unit 310 emits light to a liquid filled in the container 700 in accordance with control by the illumination control device 400. FIG. 1 shows an example of a positional relation of the first illumination unit 310, the second illumination unit 320, and the container 700 when viewed along the lateral direction, and FIG. 2 shows an example of a positional relation of the first illumination unit 310, the second illumination unit 320, and the container 700 when viewed along the imaging direction of the camera 500. As shown by FIGS. 1 and 2, the first illumination unit 310 is installed on the opposite side to a side where the camera 500 is installed when viewed from the container 700 and the grasping device 200. With such a configuration, the first illumination unit 310 emits light to the camera 500 through the container 700. As a result, as shown in FIG. 3, while the first illumination unit 310 is emitting light, transmitted light that is the light transmitted through the container 700 enters the camera 500. At the time, in a case where foreign matter that does not transmit light is present inside the container 700, the transmitted light applied to a site where the foreign matter that does not transmit light is present is blocked by the foreign matter. For example, in FIG. 3, the foreign matter that does not transmit light is shown with a solid black circle.

Further, the first illumination unit 310 has a shutter curtain using liquid crystal or the like. The shutter curtain of the first illumination unit 310 is closed when the first illumination unit 310 is not emitting light. Therefore, it can be said that the first illumination unit 310 can be brought in two states, a lighting state in which light is emitted and a lights-out state in which the shutter curtain is closed.

As with the first illumination unit 310, the second illumination unit 320 emits light to a liquid filled in the container 700 in accordance with control by the illumination control device 400. As shown in FIGS. 1 and 2, the second illumination unit 320 is installed, for example, on the side surface of the container 700. With such a configuration, the second illumination unit 320 emits light along the lateral direction of the container 700. As a result, as shown in FIG. 4, while the second illumination unit 320 is emitting light, transmitted light that is the light transmitted through the container 700 does not directly enter the camera 500. In a case where foreign matter that transmits light is present inside the container 700, the foreign matter that transmits light existing in the container 700 diffusely reflects the light. Therefore, as shown in FIG. 4, in a case where foreign matter that transmits light is present inside the container 700, the second illumination unit 320 emits light, and consequently, diffuse reflected light that is the light diffusely reflected by the foreign matter enters the camera 500. For example, in FIG. 4, a white circle represents the foreign matter that transmits light.

Further, the second illumination unit 320 can have a shutter curtain using liquid crystal or the like. The shutter curtain of the second illumination unit 320 is closed when the second illumination unit 320 is not emitting light, as with that of the first illumination unit 310. That is to say, it can be said that the second illumination unit 320 can be brought in two states, a lighting state in which light is emitted and a lights-out state in which the shutter curtain is closed. Meanwhile, the second illumination unit 320 does not necessarily need to have a shutter curtain.

The installation position of the second illumination unit 320 is not limited to the case illustrated in FIGS. 1 and 2. The second illumination unit 320 may be installed at a position other than that illustrated in FIGS. 1 and 2, such as diagonally behind, as long as light emitted by the second illumination unit 320 and transmitted through the container 700 does not directly enter the camera 500.

The illumination control device 400 is a control device that switches illumination conditions by controlling the lighting state and the lights-out state of the first illumination unit 310 and the second illumination unit 320. FIG. 5 shows an example of a configuration of the illumination control device 400. Referring to FIG. 5, the illumination control device 400 has, for example, a control unit 410.

The illumination control device 400 has, for example, an operation device such as a CPU and a storage device. For example, the illumination control device 400 implements the above processing units by execution of a program stored in the storage device by the operation unit. The illumination control device 400 may implement the above processing units by hardware.

The control unit 410 controls the states of the first illumination unit 310 and the second illumination unit 320 by transmitting lighting instructions to the first illumination unit 310 and the second illumination unit 320. For example, the control unit 410 controls the stats of the first illumination unit 310 and the second illumination unit 320 to be either a first state in which the first illumination unit 310 is in the lighting state and the second illumination unit 320 is in the lights-out state at the same time or a second state in which the first illumination unit 310 is in the lights-out state and the second illumination unit 320 is in the lighting state at the same time. As described before, in a case where the illumination condition is the first state, transmitted light that is the light transmitted through the container 700 enters the camera 500. On the other hand, in a case where the illumination condition is the second state, transmitted light that is the light transmitted through the container 700 does not enter the camera 500.

Further, the control unit 410 can control the states of the first illumination unit 310 and the second illumination unit 320 so that the lighting intervals of the first illumination unit 310 and the second illumination unit 320 are synchronized with the imaging intervals of the camera 500. In other words, the control unit 410 can control the first illumination unit 310 and the second illumination unit 320 so as to switch between the first state and the second state at intervals corresponding to the imaging intervals of the camera 500. For example, as will be described later, the camera 500 acquires image data at a high frame rate of approximately 150 to 200 fps. Therefore, the control unit 410 can control the first illumination unit 310 and the second illumination unit 320 so as to switch between the first state and the second state at an interval of 0.005 to 0.0067 seconds or a multiple thereof. The control unit 410 may be configured to transmit and receive information necessary for synchronizing the interval with the camera 500.

FIG. 6 shows an example of control by the control unit 410. For example, the control unit 410 can control the states of the first illumination unit 310 and the second illumination unit 320 so as to switch between the first state and the second state every time the camera 500 performs imaging as shown in FIG. 6. In other words, the control unit 410 can control the states of the first illumination unit 310 and the second illumination unit 320 so as to switch between the first state and the second state at regular intervals such as every 0.005 to 0.0067 seconds.

Further, the control unit 410 can be configured to change the interval to switch between the first state and second state with the passage of time. FIG. 7 shows another example of control by the control unit 410. For example, referring to FIG. 7, the control unit 410 keeps the second state until the camera 500 performs imaging two times and then switches to the first state. For example, the control unit 410 keeps the second state for 0.01 to 0.013 seconds, and then keeps the first state for 0.005 to 0.0067 seconds. The control unit 410 continues such a switching process for a predetermined period of time. Subsequently, the control unit 410 continues a process to switch between the first state and the second state at regular intervals for a predetermined period of time. After that, the control unit 410 performs, for a predetermined period of time, a process to keep the first state for 0.01 to 0.013 seconds and then keep the second state for 0.005 to 0.0067 seconds. Thus, the control unit 410 can change the interval to switch so that the second state is longer than the first state immediately after the start of imaging and, with the passage of time, the first state is longer than the second state. Meanwhile, the interval at which the control unit 410 switches between the first state and the second state may be changed in any manner, such as keeping the second state for 0.015 to 0.02 seconds and then keeping the first state for 0.005 to 0.0067 seconds. Moreover, the period of time to switch so that the second state is kept longer than the first state, the period of time to switch at regular intervals, and the period of time to switch so that the first state is kept longer than the second state may be set to any period of time, respectively. As described above, in general, a glass chip or the like, which is foreign matter that transmits light, has a greater specific gravity than foreign matter that does not transmit light, such as a rubber chip and hair, and more quickly sinks to the bottom from a swirling state in a liquid filled inside the container 700. Therefore, by making the ratio of the second state suitable for detecting foreign matter that transmits light larger at an early stage after the start of imaging, and making the first state suitable for detecting foreign matter that does not transmit light larger with the passage of time, detection in accordance with the properties of foreign matter is enabled.

For example, as described above, the control unit 410 can control the states of the first illumination unit 310 and the second illumination unit 320 so as to switch between the first state and the second state at predetermined intervals.

The camera 500 is an imaging device that images the container 700 to acquire image data. For example, the camera 500 tilts the container 700 and then starts capturing image data. As shown in FIG. 1, the camera 500 is previously installed at a predetermined position on the opposite side to a side where the first illumination unit 310 is located when viewed from the grasping device 200. The camera 500 may be configured to transmit and receive information necessary for synchronizing the intervals to and from the illumination control device 400.

For example, the camera 500 consecutively acquires image data at a high frame rate of approximately 150 to 200 fps. Then, the camera 500 transmits the acquired image data to the determination apparatus 600 together with information indicating the imaging time and the like. The camera 500 may acquire image data at a frame rate other than that illustrated above.

As described above, the states of the first illumination unit 310 and the second illumination unit 320 are controlled by the illumination control device 400. Therefore, chronological image data acquired by the camera 500 is mixture of the image data captured in the first state and the image data captured in the second state in a manner such that the image data captured in the first state and the image data captured in the second state are present alternately.

The determination apparatus 600 is an information processing apparatus that detects objects mixed inside the container 700 filled with a liquid and determines foreign matter based on image data captured/acquired by the camera 500. FIG. 8 shows an example of a configuration of the determination apparatus 600. Referring to FIG. 8, the determination apparatus 600 has, as main components, a screen display unit 610, a communication I/F unit 620, a storage unit 630, and an operation processing unit 640, for example.

The screen display unit 610 is formed by a screen display device such as a LCD (Liquid Crystal Display). The screen display unit 610 can display on a screen various kinds of information stored in the storage unit 630 such as image information 631, tracking information 632 and determination result information 633 in accordance with an instruction from the operation processing unit 640.

The communication I/F unit 620 is formed by a data communication circuit. The communication I/F unit 620 performs data communication with the camera 500, an external device and the like connected via a communication line.

The storage unit 630 is a storage device such as a hard disk and a memory. The storage unit 630 stores therein processing information necessary for various kinds of processing by the operation processing unit 640 and a program 634. The program 634 is loaded to and executed by the operation processing unit 640 to implement various kinds of processing units. The program 634 is previously loaded from an external device or a recording medium via a data input/output function such as the communication I/F unit 620, and is stored in the storage unit 630. Main information stored in the storage unit 630 are, for example, the image information 631, the tracking information 632, and the determination result information 633.

The image information 631 includes chronological image data acquired by the camera 500. In the image information 631, for example, image data is associated with information indicating time and date of acquisition of the image data by the camera 500 (information indicating the imaging time).

FIG. 9 shows an example of the chronological image data included by the image information 631. Referring to FIG. 9, in the image information 631, image data captured in the first state and image data captured in the second state are mixed. As described before, when the camera 500 acquires image data, the illumination control device 400 switches between the first state and the second state. Therefore, in the image data stored as the image information 631, the image data captured in the first state and the image data captured in the second state are mixed in a manner such that the image data captured in the first state and the image data captured in the second state are present alternately.

The tracking information 632 includes information corresponding to the result of tracking by a tracking unit 644 to be described later. For example, in the tracking information 632, identification information assigned to each object is associated with chronological information indicating the position of the object. Moreover, the chronological information indicating the position of the object includes, for example, time information and position information such as coordinates indicating the position of the object at each time.

As will be described later, after the dividing unit 642 divides the chronological image data included by the image information 631 into the chronological image data captured in the first state and the chronological image data captured in the second state, the tracking unit 644 performs tracking based on the respective chronological image data after division. Therefore, the tracking information 632 includes information corresponding to the result of tracking with the chronological data corresponding to the first state and information corresponding to the result of tracking with the chronological data corresponding to the second state.

Meanwhile, the tracking information 632 may include information other than the information of the position of the object as illustrated above. For example, the tracking information 632 may include information indicating the area of a detection region.

The determination result information 633 includes information indicating the result of determination by the determining unit 645. For example, in the determination result information 633, identification information assigned to each object is associated with information indicating the result of determination based on the tracking information 632 by the determining unit 645. That is to say, the determination result information 633 includes information indicating whether the detected object is foreign matter, an air bubble, or a scratch, a stain or the like on the container.

The operation processing unit 640 has a microprocessor such as a MPU and a peripheral circuit thereof. The operation processing unit 640 loads the program 634 from the storage unit 630 and executes the program 634 to make the abovementioned hardware cooperate with the program 634 and implement various kinds of processing units. Main processing units implemented by the operation processing unit 640 are, for example, an image acquisition unit 641, the dividing unit 642, a detecting unit 643, the tracking unit 644, the determining unit 645, and an output unit 646.

The image acquisition unit 641 acquires image data acquired by the camera 500 from the camera 500 via the communication I/F unit 620. Then, the image acquisition unit 641 associates the acquired data with, for example, time and date of acquisition of the image data (information indicating the imaging time), and stores as the image information 631 into the storage unit 630.

The dividing unit 642 divides chronological image data included by the image information 631 into chronological image data captured in the first state and chronological image data captured in the second state. For example, the determination apparatus 600 has information indicating under what condition (at what interval) the illumination control device 400 switches between the first state and the second state. Then, by using the above information, the dividing unit 642 divides the chronological image data included by the image information 631 into the chronological image data captured in the first state and the chronological image data captured in the second state based on time or the like corresponding to image data.

FIG. 10 is a view for describing an example of a division process by the dividing unit 642. As shown in FIG. 10, the dividing unit 642 divides the image information 631 in which the image data captured in the first state and the image data captured in the second state are mixed, into the chronological image data captured in the first state and the chronological image data captured in the second state.

Meanwhile, the dividing unit 642 may divide the chronological image data based on information other than the time. For example, the dividing unit 642 may divide the chronological image data into the chronological image data captured in the first state and the chronological image data captured in the second state based on the ratio of lightness and darkness when image data is binarized. The dividing unit 642 may perform the division process by combination of the methods illustrated above.

The detecting unit 643 detects objects existing within a region corresponding to the container 500 and a liquid filled in the container 500. For example, the detecting unit 643 performs a binarization process on image data and detects objects based on the result of the binarization process. Meanwhile, the detecting unit 643 may detect objects by another known technique.

In this example embodiment, the detecting unit 643 detects an object from each of the chronological image data captured in the first state obtained by division by the dividing unit 642, and also detects an object from each of the chronological image data captured in the second state. As shown in FIG. 3, in the first state, the transmitted light enters the camera 500, whereas the transmitted light applied to a site where foreign matter that does not transmit light is present is blocked by the foreign matter. Therefore, the detecting unit 643 can detect mainly an object including foreign matter that does not transmit light based on the image data captured in the first state. On the other hand, as shown in FIG. 4, in the second state, the transmitted light does not enter the camera 500, whereas diffuse reflected light by foreign matter that transmits light enters the camera 500. Therefore, the detecting unit 643 can detect mainly an object including foreign matter that transmits light based on the image data captured in the second state.

The tracking unit 644 tracks an object detected by the detecting unit 643. As described before, the camera 500 acquires image data at a high frame rate such as 200 fps. Therefore, it is assumed that the positions of the same object in two pieces of image data with consecutive imaging times (the imaging times are closer than a predetermined value) are extremely close to each other. Therefore, the tracking unit 644 compares the position of an object detected by the detecting unit 643 with the position of an object detected by the detecting unit 643 in image data with the previous imaging time (or within the predetermined value). In a case where an object with a distance equal to or less than a predetermined threshold value from the object detected by the detecting unit 643 is present in the image data with the previous imaging time, the tracking unit 644 determines that the object detected by the detecting unit 643 and the object detected by the detecting unit 643 in the image data with the previous imaging time that are separated by the distance equal to or less than the threshold value are the same objects. In this case, the tracking unit 644 provides the object detected by the detecting unit 643 with identification information such as an ID provided to the object determined to be the same object. On the other hand, in a case where an object with a distance equal to or less than the predetermined threshold value from the object detected by the detecting unit 643 is not present in the image data with the previous imaging time (or within the predetermined value), the tracking unit 644 determines that a new object is detected. In this case, the tracking unit 644 assigns identification information such as a new ID to the detected object.

For example, in the above manner, the tracking unit 644 performs tracking based on a distance between objects in different image data and thereby assigns identification information to an object detected by the detecting unit 643. Moreover, the tracking unit 644 acquires coordinates indicating the position of the object detected by the detecting unit 643. Then, the tracking unit 644 associates the identification information, time information indicating the imaging time of the image data, and the coordinates, and stores as the tracking information 632 into the storage unit 630.

In this example embodiment, the tracking unit 644 performs tracking based on chronological image data captured in the first state obtained by division by the dividing unit 642, and also performs tracking based on chronological image data captured in the second state. That is to say, the tracking unit 644 performs comparison of positions based on the chronological image data captured in the first state, and performs comparison of positions based on the chronological image data captured in the second state. As described before, the detecting unit 643 detects mainly an object including foreign matter that does not transmit light based on the image data captured in the first state. Therefore, the tracking unit 644 can track mainly an object including foreign matter that does not transmit light based on the chronological image data captured in the first state. On the other hand, the detecting unit 643 detects mainly an object including foreign matter that transmits light based on the image data captured in the second state. Therefore, the tracking unit 644 can track mainly an object including foreign matter that transmits light based on the chronological image data captured in the second state.

The determining unit 645 determines whether an object detected by the detecting unit 643 is an air bubble or foreign matter based on the tracking information 632. Then, the determining unit 645 stores the result of determination of each object detected by the detecting unit 643 as the determination result information 633 into the storage unit 630.

For example, in the case of determining that the object is moving upward based on the tracking information 632, the determining unit 645 determines that the object is an air bubble. On the other hand, in the case of determining that the object is moving downward based on the tracking information 632, the determining unit 645 determines that the object is foreign matter. For example, in the above manner, by determining the moving direction of the object based on the tracking information 632, the determining unit 645 can determine whether the object is an air bubble or foreign matter. Meanwhile, the determining unit 645 may determine whether the object is an air bubble or foreign matter by a method other than the method illustrated above, such as performing the above determination using a previously trained model or the like.

As described above, the tracking information 632 includes information corresponding to the result of tracking using chronological data corresponding to the first state and information corresponding to the result of tracking using chronological data corresponding to the second state. Therefore, the determining unit 645 may determine whether the object is an air bubble or foreign matter that does not transmit light based on the information corresponding to the result of tracking using the chronological data corresponding to the first state among the tracking information 632. Likewise, the determining unit 645 may determine whether the object is an air bubble or foreign matter that transmits light based on the information corresponding to the result of tracking using the chronological data corresponding to the second state among the tracking information 632. Thus, the determining unit 645 can determine whether the object is an air bubble or foreign matter, and can also determine whether or not the foreign matter transmits light.

The determining unit 645 may use information other than the tracking information 632 when determining the object. For example, the determining unit 645 can determine the object also using information indicating the image characteristics, size, average luminance value and the like of the object. By determining also using information other than movement, such as the size and average brightness value of the object, it is possible to comprehensively determine the characteristics of an air bubble and foreign matter, so that higher determination accuracy can be obtained.

The output unit 646 outputs the image information 631, the tracking information 632, the determination result information 633 and the like. For example, the output unit 646 can display the image information 631, the tracking information 632, the determination result information 633 and the like on the screen display unit 610, and transmit them to an external device via the communication I/F unit 620.

The above is an example of the configuration of the determination apparatus 600.

The determination apparatus 600 may have a configuration other than that described above. For example, the determination apparatus 600 can be configured to instruct the grasping device 200 to tilt/rotate or to stop tilting/rotating.

The container 700 is a translucent container such as a glass bottle or a plastic bottle. The inside of the container 700 is filled with a liquid such as water or medicine. Foreign matter may be contained inside the container 700. Possible foreign matter are, for example, foreign matter that does not transmit light such as a rubber chip, hair, a fiber piece and soot, and foreign matter that transmits light such as glass or a plastic chip.

The above is an example of the configurations of the grasping device 200, the first illumination unit 310, the second illumination unit 320, the illumination control device 400, the camera 500, and the determination apparatus 600 included by the determination system 100. Next, an example of an operation of the determination apparatus 600 will be described with reference to FIGS. 11 and 12.

Referring to FIG. 11, the image acquisition unit 641 acquires image data acquired by the camera 500 from the camera 500 via the communication I/F unit 620 (step S101). The image acquisition unit 641 acquires chronological image data in which image data captured in the first state and image data captured in the second state are mixed.

The dividing unit 642 divides the chronological image data into chronological image data captured in the first state and chronological image data captured in the second state (step S102). For example, the determination apparatus 600 has information indicating under what condition (at what interval) the illumination control device 400 switches between the first state and the second state. Using the above information, the dividing unit 642 divides the chronological image data included in the image information 631 into the chronological image data captured in the first state and the chronological image data captured in the second state. The dividing unit 642 may perform the division process by a method other than the method illustrated above.

The detecting unit 643 detects an object existing in a region corresponding to the container 700 and the liquid filled in the container 700 based on the chronological image data captured in the first state (step S111). In processing at step S111, the detecting unit 643 detects mainly an object including foreign matter that does not transmit light. The detecting unit 643 may detect the object by a known technique.

The tracking unit 644 tracks the object detected by the detecting unit 643 (step S112). That is to say, the tracking unit 644 tracks mainly the object including foreign matter that does not transmit light. For example, the tracking unit 644 tracks the object based on a distance between objects in image data captured at close (or consecutive) imaging times.

In a case where the tracking unit 644 has not tracked all the objects detected by the detecting unit 643 in the image data (step S113, No), the tracking unit 644 tracks the object having not been tracked. On the other hand, in a case where the tracking unit 644 has tracked all the objects detected by the detecting unit 643 in the image data (step S113, Yes), the tracking unit 644 finishes the tracking based on the image data.

In a case where the tracking on all the chronological image data captured in the first state obtained by division by the dividing unit 642 is finished (step S114, Yes), the determination apparatus 600 ends the processing based on the chronological image data captured in the first state. On the other hand, in a case where image data having not been detected or tracked is left (step S114, No), the determination apparatus 600 continues the detection by the detecting unit 643 and the tracking by the tracking unit 644.

Further, the detecting unit 643 detects an object existing in the region corresponding to the container 700 and the liquid filled in the container 700 based on the chronological image data captured in the second state (step S121). In processing at step S121, the detecting unit 643 detects mainly an object including foreign matter that transmits light. The detecting unit 643 may detect the object by a known technique.

The tracking unit 644 tracks the object detected by the detecting unit 643 (step S122). That is to say, the tracking unit 644 tracks mainly the object including foreign matter that transmits light. For example, the tracking unit 644 tracks the object based on a distance between objects in image data captured at close (or consecutive) imaging times.

In a case where the tracking unit 644 has not tracked all the objects detected by the detecting unit 643 in the image data (step S123, No), the tracking unit 644 tracks the object having not been tracked. On the other hand, in a case where the tracking unit 644 has tracked all the objects detected by the detecting unit 643 in the image data (step S123, Yes), the tracking unit 644 finishes the tracking based on the image data.

In a case where the tracking on all the chronological image data captured in the second state obtained by division by the dividing unit 642 is finished (step S124, Yes), the determination apparatus 600 ends the processing based on the chronological image data captured in the second state. On the other hand, in a case where image data having not been detected or tracked is left (step S124, No), the determination apparatus 600 continues the detection by the detecting unit 643 and the tracking by the tracking unit 644.

The above is an example of the operation of the determination apparatus 600. Meanwhile, the processing at steps S111 to S114 and the processing at steps S121 to S124 may be performed in parallel. Subsequently, an example of processing by the determining unit 645 will be described with reference to FIG. 12.

Referring to FIG. 12, the determining unit 645 acquires the tracking information 632 (step S201).

Based on the tracking information 632, the determining unit 645 determines whether the object detected by the detecting unit 643 is an air bubble or foreign matter (step S202). For example, the determining unit 645 can determine whether the object is an air bubble or foreign matter based on the moving direction of the object. The determining unit 645 may perform the determination by a method other than the method illustrated above. Meanwhile, the determining unit 645 may determine whether the object is an air bubble or foreign matter and also determine whether the foreign matter is foreign matter that transmits light or foreign matter that does not transmit light.

The above is an example of the processing by the determining unit 645.

As described above, the determination apparatus 600 has the dividing unit 642, the detecting unit 643, the tracking unit 644, and the determining unit 645. With such a configuration, the tracking unit 644 can perform tracking of an object detected by the detecting unit 643 based on chronological image data captured in the first state obtained by division by the dividing unit 642, and tracking of an object detected by the detecting unit 643 based on chronological image data captured in the second state. Moreover, the determining unit 645 can perform determination based on the result of the tracking by the tracking unit 644. Consequently, it becomes possible to, based on chronological data obtained by consecutively imaging, perform detection, tracking, and determination by a method favorable for foreign matter that transmits light, and also perform detection, tracking, and determination by a method favorable for foreign matter that does not transmit light. As a result, it becomes possible to efficiently detect foreign matter with high accuracy.

The configuration of the determination system 100 is not limited to the case illustrated in this example embodiment. For example, as shown in FIG. 13, the determination system 100 can have a third illumination unit 330. The third illumination unit 330 emits light to the liquid filled in the container 700 at the same intervals as those of the second illumination unit 320. As shown in FIG. 13, the third illumination unit 330 can be installed, for example, on a side along the lateral direction of the container 700 and opposite to the side where the second illumination unit 320 is installed when viewed from the container 700. Thus, the determination system 100 may have a plurality of lights.

Further, in this example embodiment, a case where the function of the determination apparatus 600 is realized by one information processing apparatus has been described. However, the function of the determination apparatus 600 may be realized by a plurality of information processing apparatuses connected via a network.

Further, in this example embodiment, the determination system 100 has the illumination control device 400 and the determination apparatus 600. However, the determination apparatus 600 may have the function of the illumination control device 400. That is to say, the illumination control device 400 and the determination apparatus 600 can be configured integrally. In a case where the determination apparatus 600 has the function of the illumination control device 400, the determination system 100 does not need to have the separate illumination control device 400.

Further, in this example embodiment, as an example of the illumination condition, the first state in which the first illumination unit 310 is in the lighting state and the second illumination unit 320 is in the lights-out state at the same time, and the second state in which the first illumination unit 310 is in the lights-out state and the second illumination unit 320 is in the lighting state at the same time are shown. However, the illumination condition is not necessarily limited to that illustrated in this example embodiment. For example, the illumination condition may include a state other than that illustrated above, such as a state in which the first illumination unit 310 is in the lighting state and the second illumination unit 320 is in the lighting state at the same time, and a state in which the first illumination unit 310 and the second illumination unit 320 are in the lights-out state and the third illumination unit 330 is in the lighting state. Moreover, for example, switching other than that illustrated in this example embodiment may be performed, such as switching between a state in which the first illumination unit 310 is in the lighting state and the second illumination unit 320 is in the lighting state and a state in which the first illumination unit 310 is in the lights-out state and the second illumination unit 320 is in the lighting state.

Second Example Embodiment

Next, a second example embodiment of the present invention will be described with reference to FIGS. 14 and 15. In the second example embodiment, the outline of a configuration of a determination apparatus 800 will be described.

Figure 14:
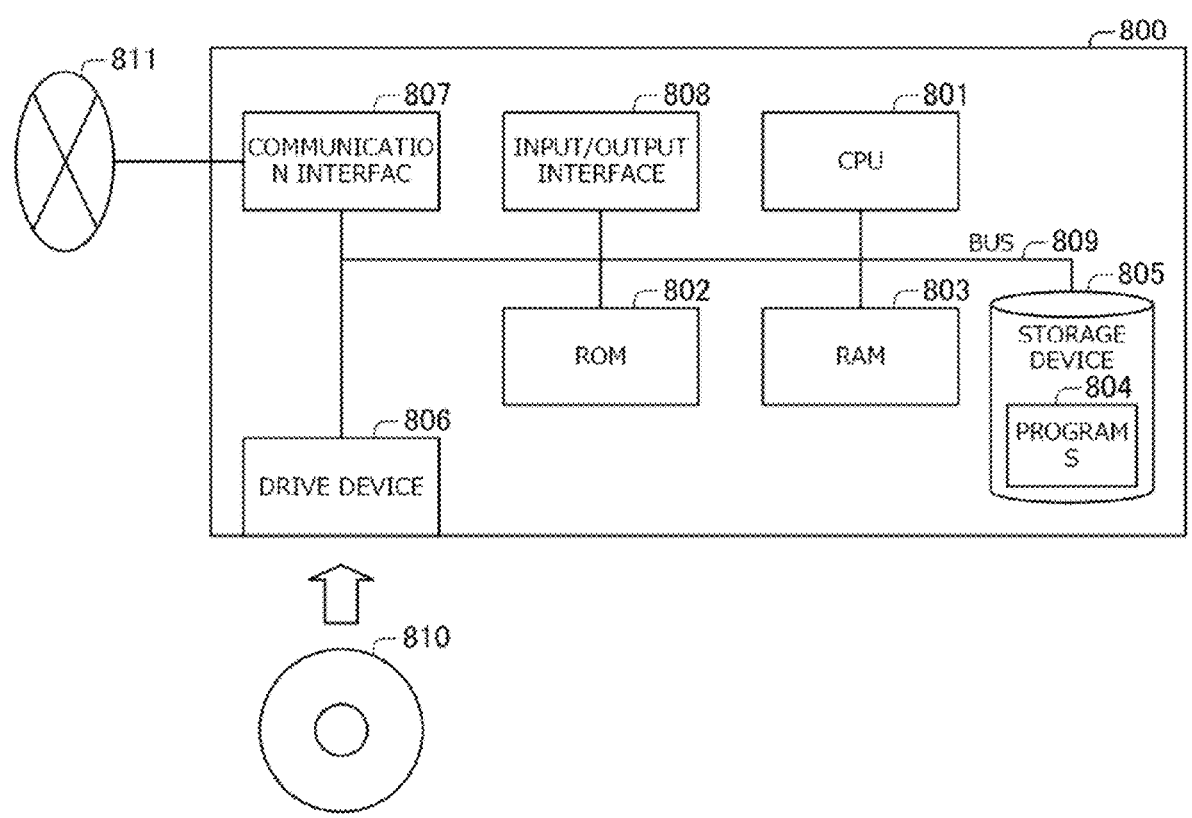
FIG. 14 is a view showing an example of a hardware configuration diagram of a determination apparatus in a second example embodiment of the present disclosure.

FIG. 14 shows an example of a hardware configuration of the determination apparatus 800. Referring to FIG. 14, the determination apparatus 800 has, as an example, a hardware configuration as shown below including;
- a CPU (Central Processing Unit) 801 (operation device),
- a ROM (Read Only Memory) 802 (storage device),
- a RAM (Random Access Memory) 803 (storage device),
- programs 804 loaded to the RAM 803,
- a storage device 805 for storing the programs 804,
- a drive device 806 reading from and writing into a recording medium 810 outside the information processing apparatus,
- a communication interface 807 connected to a communication network 811 outside the information processing apparatus,
- an input/output interface 808 performing input and output of data, and
- a bus 809 connecting the respective components.

Figure 15:
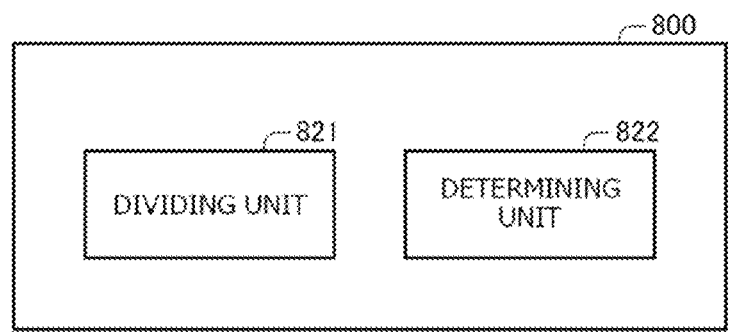
FIG. 15 is a block diagram showing an example of a configuration of the determination apparatus in the second example embodiment of the present disclosure.

Further, by acquisition and execution of the programs 804 by the CPU 801, the determination apparatus 800 can implement the functions of a dividing unit 821 and a determining unit 822 shown in FIG. 15. The programs 804 are, for example, stored in the storage device 805 or the ROM 802 in advance, and are loaded to the RAM 803 or the like and executed by the CPU 801 as necessary. Moreover, the programs 804 may be supplied to the CPU 801 via the communication network 811, or may be stored in the recording medium 810 in advance and retrieved and supplied to the CPU 801 by the drive device 806.

FIG. 14 shows an example of the hardware configuration of the determination apparatus 800. The hardware configuration of the determination apparatus 800 is not limited to that described above. For example, the determination apparatus 800 may be configured by part of the above configuration, for example, excluding the drive device 806.

The dividing unit 821 divides chronological image data acquired by imaging a liquid filled in a container while switching between a plurality of illumination conditions into chronological image data corresponding to the illumination conditions. For example, the illumination conditions include a first state in which transmitted light that is light having transmitted the container enters an imaging device that acquires image data, and a second state in which the transmitted light that is the light having transmitted the container does not enter the imaging device that acquires image data. In a case where the illumination conditions include the first state and the second state, the dividing unit 821 can divide the acquired chronological image data into chronological image data captured in the first state and chronological image data captured in the second state.

The determining unit 822 determines foreign matter contained inside the container based on the respective chronological image data obtained by division by the dividing unit 821.

Thus, the determination apparatus 800 has the dividing unit 821 and the determining unit 822. With such a configuration, the determining unit 822 can determine foreign matter contained inside the container based on the respective chronological image data obtained by division by the dividing unit 821. Consequently, it becomes possible to perform determination after dividing chronological data obtained by consecutively imaging based on the imaging conditions. As a result, it becomes possible to efficiently detect foreign matter with accuracy.

The determination apparatus 800 described above can be implemented by installation of a predetermined program in the determination apparatus 800. Specifically, a program as another aspect of the present invention is a program for causing the determination apparatus 800 to implement: a dividing unit that divides chronological image data acquired by imaging a liquid filled in a container while switching between a plurality of illumination conditions into chronological image data corresponding to the illumination conditions; and a determining unit that determines foreign matter contained inside the container based on the respective chronological image data obtained by division by the dividing unit.

Further, a determination method executed by the determination apparatus 800 described above is a method executed by the determination apparatus 800 including: dividing chronological image data acquired by imaging a liquid filled in a container while switching between a plurality of illumination conditions into chronological image data corresponding to the illumination conditions; and determining foreign matter contained inside the container based on the respective chronological image data obtained by division by the dividing unit.

The invention of the program or the determination method having the above configuration also has the same actions and effects as the determination apparatus 800, and therefore, can achieve the abovementioned object of the present invention.

<Supplementary Notes>

The whole or part of the example embodiments disclosed above can be described as the following supplementary notes. Below, the overview of a determination apparatus and others according to the present invention will be described. However, the present invention is not limited to the following configurations.

(Supplementary Note 1)

A determination apparatus comprising:
 a dividing unit configured to divide chronological image data acquired by imaging a liquid filled in a container while switching between a plurality of illumination conditions, into chronological image data corresponding to the illumination conditions; and
 a determining unit configured to determine foreign matter contained in the container based on each of the chronological image data obtained by division by the dividing unit.

(Supplementary Note 2)

The determination apparatus according to Supplementary Note 1, wherein
 the illumination conditions include a first state and a second state, the first state being a state in which light transmitted through the container enters an imaging device acquiring image data, the second state being a state in which light transmitted through the container does not enter the imaging device acquiring image data.

(Supplementary Note 3)

The determination apparatus according to Supplementary Note 2, wherein
 in the second state in which the light transmitted through the container does not enter the imaging device acquiring image data, a shutter curtain included by a lighting unit configured to emit light in the first state is in a closed state.

(Supplementary Note 4)

The determination apparatus according to Supplementary Note 2 or 3, wherein
 an interval to switch between the first state and the second state changes with passage of time.

(Supplementary Note 5)

The determination apparatus according to any one of Supplementary Notes 1 to 4, wherein
 the dividing unit is configured to divide chronological image data acquired by imaging while switching between the illumination conditions in accordance with an imaging interval of the imaging device acquiring image data.

(Supplementary Note 6)

The determination apparatus according to Supplementary Note 5, wherein
 the dividing unit is configured to divide the chronological image data based on information indicating time at which image data has been acquired.

(Supplementary Note 7)

The determination apparatus according to any one of Supplementary Notes 1 to 6, comprising
 a detecting unit configured to detect an object from each image data included by each of the chronological image data obtained by division by the dividing unit; and a tracking unit configured to track the object detected by
the detecting unit for each of the chronological image
data obtained by division by the dividing unit,
wherein the determining unit is configured to determine
whether or not the object detected by the detecting unit
is the foreign matter based on a result of tracking by the
tracking unit.

(Supplementary Note 8)

The determination apparatus according to Supplementary Note 7, wherein
the determining unit is configured to determine whether
the object is an air bubble or the foreign matter.

(Supplementary Note 9)

The determination apparatus according to Supplementary Note 7 or 8, wherein
the determining unit is configured to determine whether or
not the object is the foreign matter, and also determine
whether or not the foreign matter transmits light.

(Supplementary Note 10)

A determination method executed by a determination apparatus, the determination method comprising:
dividing chronological image data acquired by imaging a
liquid filled in a container while switching between a
plurality of illumination conditions, into chronological
image data corresponding to the illumination conditions; and
determining foreign matter contained in the container
based on each of the chronological image data obtained
by division.

(Supplementary Note 11)

A non-transitory computer-readable recording medium having a program recorded thereon, the program comprising instructions for causing a determination apparatus to implement:
a dividing unit configured to divide chronological image
data acquired by imaging a liquid filled in a container
while switching between a plurality of illumination
conditions, into chronological image data corresponding to the illumination conditions; and
a determining unit configured to determine foreign matter
contained in the container based on each of the chronological image data obtained by division by the dividing
unit.

(Supplementary Note 12)

A determination system comprising:
a first lighting unit configured to emit light so that light
transmitted through a container enters an imaging
device acquiring image data;
a second lighting unit configured to emit light so that light
transmitted through the container does not enter the
imaging device acquiring image data;
the imaging device configured to image a liquid filled in
the container in an environment that an illumination
condition is switched between a plurality of illumination conditions including a first state in which the first
lighting unit emits light and a second state in which the
second lighting unit emits light; and
a determination apparatus including a dividing unit and a
determining unit, the dividing unit being configured to
divide chronological image data acquired by the imaging device into chronological image data corresponding
to the illumination conditions, the determining unit
being configured to determine foreign matter contained
in the container based on each of the chronological
image data obtained by division by the dividing unit.

(Supplementary Note 13)

The determination system according to Supplementary Note 12, wherein
the first lighting unit has a shutter curtain closed when
light is not emitted.

(Supplementary Note 14)

The determination system according to Supplementary Note 12 or 13, comprising
an illumination control device configured to switch
between the first state in which the first lighting unit
emits light and the second state in which the second
lighting unit emits light.

(Supplementary Note 15)

The determination system according to Supplementary Note 14, wherein
the illumination control device is configured to switch
between the first state and the second state at regular
intervals.

(Supplementary Note 16)

The determination system according to Supplementary Note 14 or 15, wherein
the illumination control device is configured to change an
interval to switch between the first state and the second
state with passage of time.

(Supplementary Note 17)

The determination system according to any one of Supplementary Notes 14 to 16, wherein
the illumination control device is configured to change an
interval to switch between the first state and the second
state from a state in which the second state is longer
than the first state to a state in which the first state is
longer than the second state with passage of time.

(Supplementary Note 18)

The determination system according to any one of Supplementary Notes 14 to 17, wherein
the illumination control device is configured to switch
between the first state and the second state in accordance with an imaging interval of the imaging device
acquiring image data.

The program described in the example embodiments and supplementary notes is stored in a storage device, or recorded on a computer-readable recording medium. For example, the recording medium is a portable medium such as a flexible disk, an optical disk, a magnetooptical disk, and a semiconductor memory.

Although the present invention has been described above with reference to the example embodiments, the present invention is not limited to the above example embodiments. The configurations and details of the present invention can be changed in various manners that can be understood by one skilled in the art within the scope of the present invention.

DESCRIPTION OF REFERENCE NUMERALS 100 determination system
200 grasping device
310 first illumination unit
320 second illumination unit
330 third illumination unit
400 illumination control device
410 control unit
500 camera
600 determination apparatus
610 screen display unit
620 communication I/F unit
630 storage unit 631 image information
632 tracking information
633 determination result information
634 program
640 operation processing unit
641 image acquisition unit
642 dividing unit
643 detecting unit
644 tracking unit
645 determining unit
646 output unit
700 container
800 determination apparatus
801 CPU
802 ROM
803 RAM
804 programs
805 storage device
806 drive device
807 communication interface
808 input/output interface
809 bus
810 recording medium
811 communication network
821 dividing unit
822 determining unit

What is claimed is:

1. A determination system comprising:
a first lighting unit configured to emit light so that light transmitted through a container enters an imaging device acquiring image data;
a second lighting unit configured to emit light so that light transmitted through the container does not enter the imaging device acquiring image data;
the imaging device configured to image a liquid filled in the container in an environment that an illumination condition is switched between a plurality of illumination conditions including a first state in which the first lighting unit emits light and a second state in which the second lighting unit emits light; and
a determination apparatus including at least one memory configured to store instructions and at least one processor configured to execute the instructions to divide chronological image data acquired by the imaging device into chronological image data corresponding to the illumination conditions and determine foreign matter contained in the container based on each of the chronological image data obtained by division.

2. The determination system according to claim 1, wherein
the first lighting unit has a shutter curtain closed when light is not emitted.

3. The determination system according to claim 1, comprising
an illumination control device configured to switch between the first state in which the first lighting unit emits light and the second state in which the second lighting unit emits light.

4. The determination system according to claim 3, wherein
the illumination control device is configured to switch between the first state and the second state at regular intervals.

5. The determination system according to claim 3, wherein
the illumination control device is configured to change an interval to switch between the first state and the second state with passage of time.

6. The determination system according to claim 3, wherein
the illumination control device is configured to change an interval to switch between the first state and the second state from a state in which the second state is longer than the first state to a state in which the first state is longer than the second state with passage of time.

7. The determination system according to claim 3, wherein
the illumination control device is configured to switch between the first state and the second state in accordance with an imaging interval of the imaging device acquiring image data.

* * * * *